United States Patent
Koblenz

(12) 
(10) Patent No.: US 6,430,676 B1
(45) Date of Patent: Aug. 6, 2002

(54) METHOD AND SYSTEM FOR CALCULATING INSTRUCTION LOOKAHEAD

(75) Inventor: Brian D. Koblenz, Seattle, WA (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 09/220,969

(22) Filed: Dec. 23, 1998

(51) Int. Cl.$^7$ .................................................. G06F 9/00
(52) U.S. Cl. ........................................ 712/207; 717/151
(58) Field of Search ................................ 712/233, 334, 712/235, 236, 337, 239, 207, 216; 717/151

(56) References Cited

U.S. PATENT DOCUMENTS

| | | |
|---|---|---|
| 4,819,234 A | 4/1989 | Huber |
| 4,872,167 A | 10/1989 | Maezawa et al. |
| 5,168,554 A | 12/1992 | Luke |
| 5,301,325 A | 4/1994 | Benson |
| 5,333,280 A | 7/1994 | Ishikawa et al. |
| 5,450,575 A | 9/1995 | Sites |
| 5,504,932 A | 4/1996 | Vassiliadis et al. |
| 5,533,192 A | 7/1996 | Hawley et al. |
| 5,557,761 A | 9/1996 | Chan |
| 5,564,051 A | 10/1996 | Halliwell et al. |
| 5,581,764 A | 12/1996 | Fitzgerald et al. |
| 5,594,864 A | 1/1997 | Trauben |
| 5,598,560 A | 1/1997 | Benson |
| 5,632,032 A | 5/1997 | Ault et al. |
| 5,652,889 A | 7/1997 | Sites |
| 5,712,996 A | 1/1998 | Schepers |
| 5,742,803 A  * | 4/1998 | Igarashi ..................... 712/233 |
| 5,754,855 A | 5/1998 | Miller et al. |
| 5,768,591 A | 6/1998 | Robinson |
| 5,768,592 A | 6/1998 | Chang |
| 5,774,721 A | 6/1998 | Robinson |
| 5,787,245 A | 7/1998 | You et al. |
| 5,805,892 A | 9/1998 | Nakajima |

(List continued on next page.)

FOREIGN PATENT DOCUMENTS

| | | |
|---|---|---|
| DE | 19710252 | 2/1998 |
| EP | 0422945 | 4/1991 |
| EP | 0455966 | 11/1991 |
| EP | 0537098 | 4/1993 |
| EP | 0855648 | 7/1998 |
| EP | 0864979 | 9/1998 |
| GB | 2307760 | 6/1997 |

OTHER PUBLICATIONS

Tera MTA Principles of Operation, Nov. 18, 1997.
Goldman, Kenneth, J., "Introduction to Data Structures," 1996, Retrieved from Internet http://www.cs.wustl.edu/{kjg/CS101_SP97/Notes?Data Structures/structures.html.
A. Ram., et al., "Parallel Garbage Collection Without Synchronization Overhead," 12$^{th}$ Annual Symposium on Computer Architecture, Jun. 17, 1985.
H. Hayashi et al., "ALPHA: A High Performance Lisp Machine Equipped with a New Stack Structure and Garbage Collection System," Computer Architecture, 1983.

(List continued on next page.)

*Primary Examiner*—Eric Coleman
(74) *Attorney, Agent, or Firm*—Perkins Coie LLP

(57) ABSTRACT

A computer-based method and system for determining designations for conditional branch operations and settings for lookahead values for a portion of a computer program. The lookahead system of the present invention evaluates various combinations of designations for the conditional branch operations for the portion of the computer program. The lookahead system generates a metric to measure the amount of parallel processing that would result from each combination of designations assuming that the lookahead values are set to optimal values for that combination. This metric may take into consideration estimated or actual execution frequencies of the instructions. The lookahead system then designates the conditional branch operations and sets the lookahead values based on the metric generated for one of the combinations.

71 Claims, 9 Drawing Sheets

U.S. PATENT DOCUMENTS

| | | | |
|---|---|---|---|
| 5,812,811 A | * | 9/1998 | Dubey et al. ............... 395/392 |
| 5,826,265 A | | 10/1998 | Van Huben et al. |
| 5,867,643 A | | 2/1999 | Sutton |
| 5,877,766 A | | 3/1999 | Bates et al. |
| 5,887,166 A | | 3/1999 | Mallick et al. |
| 5,901,315 A | | 5/1999 | Edwards et al. |
| 5,903,730 A | | 5/1999 | Asai et al. |
| 5,913,925 A | | 6/1999 | Kahle et al. |
| 5,953,530 A | | 9/1999 | Rishi et al. |
| 5,961,639 A | | 10/1999 | Mallick et al. |
| 5,966,539 A | | 10/1999 | Srivastava |
| 5,978,902 A | | 11/1999 | Mann |
| 6,002,872 A | | 12/1999 | Alexander, III et al. |
| 6,002,879 A | | 12/1999 | Radigan et al. |
| 6,009,269 A | | 12/1999 | Burrows et al. |
| 6,029,005 A | | 2/2000 | Radigan |
| 6,049,671 A | | 4/2000 | Slivka et al. |
| 6,058,493 A | | 5/2000 | Talley |
| 6,059,840 A | | 5/2000 | Click, Jr. |
| 6,072,952 A | | 6/2000 | Janakiraman |
| 6,094,716 A | * | 7/2000 | Witt ............................ 712/23 |
| 6,101,524 A | | 8/2000 | Choi et al. |
| 6,112,293 A | * | 8/2000 | Witt .......................... 712/216 |
| 6,128,773 A | * | 10/2000 | Snider ........................ 702/182 |
| 6,151,701 A | | 11/2000 | Humphreys et al. |
| 6,151,704 A | | 11/2000 | Radigan |

OTHER PUBLICATIONS

Smith, Burton, "Opportunities for Growth in High Performance Computing," Nov. 1994.

Gail Alverson et al., "Tera Hardware–Software Cooperation", Proceedings of Supercomputing 1997, San Jose, California, Nov. 1997.

D.H. Bailey et al., "The NAS Parallel Benchmarks—Summary and Preliminary Results," Numerical Aerodynamic Simulation (NAS) Systems Division, NASA Ames Research Center, California, 1991.

Robert Alverson et al, "The Tera Computer System,"Proceedings of 1990 ACM International Conference on Supercomputing, Jun. 1990.

Gail Alverson et al., "Scheduling on the Tera MTA," Job Scheduling Strategies for Parallel Processing, 1995.

Smith, Burton, The Quest for General–Purpose Parallel Computing.

Briggs, Preston and Keith D. Cooper, "Effective Partial Redundancy Elimination," ACM SIGPLAN Notices, Association for Computing Machinery, New York, vol. 29, No. 6, Jun. 1, 1994.

Click, Cliff, "Global Code Motion, Global Value Numbering," ACM SIGPLAN Notices, Association for Computing Machinery, New York, vol. 30, No. 6, Jun. 1, 1995.

Sreedhar, Vugranam C. and Guang R. Gao, "Incremental Computation of Dominator Trees," ACM SIGPLAN Notices, Association for Computing Machinery, New York, vol. 30, No. 3, Mar. 1, 1995.

Galarowicz, Jim et al., "Analyzing Message Passing Programs on the Cray T3E with PAT and VAMPIR," Research Report, "Online!", May 1998.

Anderson, Jennifer et al., "Continuous Profiling: Where Have All The Cycles Gone?," Operating Systems Review, ACM Headquarters, New York, vol. 31, No. 5, Dec. 1, 1997.

Major System Characteristics of the TERA MTA, 1995.

Touzeau, Roy F., "A Fortran Compiler for the FPS–164 Scientific Computer," Proceedings of the ACM SIGPLAN '84 Symposium on Compiler Construction, SIGPLAN Notices 19(6):48–57, Jun. 1984.

Linton, Mark A., "The Evolution of Dbx,"USENIX Summer Conference, Jun. 11–15, 1990.

David Callahan and Burton Smith, A Future–Based Parallel Language for a General–Purpose Highly–Parallel Computer, Languages and Compilers for Parallel Computing, MIT Press, 1990.

David Callahan et al., "Improving Register Allocation for Subscripted Variables," Proceedings of the ACM SIGPLAN Conference on Programming Language Design and Implementation, White Plans, New York, Jun. 20–22, 1990.

Adelberg, Brad et al., "The Strip Rule System for Efficiently Maintaining Derived Data," Sigmod Record, Association for Computing Machinery, New York, vol. 26, No. 2, Jun. 1, 1997.

Surajit, Chaudhuri and Umeshwar Dayal, "An Overview of Data Warehousing and OLAP Technology," Sigmod Record, Association for Computing, New York, vol. 26, No. 1, Mar. 1997.

Agrawal, Gagan and Joel Saltz, "Interprocedural Data Flow Based Optimizations for Compilation of Irregular Problems," Annual Workshop on Languages and Compilers for Parallel Computing, 1995.

Callahan, David, "Recognizing and Parallelizing Bounded Recurrences," Aug. 1991.

Smith, Burton, "The End of Architecture," Keynote Address Presented at the $17^{th}$ Annual Symposium on Computer Architecture, Seattle, Washington, May 29, 1990.

Richard Korry et al., "Memory Management in the Tera MTA System," 1995.

Gail Alverson et al., "Processor Management in the Tera MTA System," 1995.

Jack W. Davidson and David B. Whalley, "Reducing the Cost of Branches by Using Registers," Proceedings of the $17^{th}$ Annual International Symposium on Computer Architecture, Seattle, Washington, May 28–31, 1990.

Knoop, Jens et al., "The Power of Assignment Motion," ACM SIGPLAN '95 Conference on Programming Language Design and Implementation, La Jolla, California, Jun. 18–21, 1995.

Agrawal, Hiralal, "Dominators, Super Blocks, and Program Coverage," $21^{st}$ ACM SIGPLAN–SIGACT Symposium on Principles of Programming Languages, Portland, Oregon, Jan. 17–21, 1994.

Thomas Lang and Miquel Huguet, "Reduced Register Saving/Restoring in Single–Window Register Files," Computer Architecture News, vol. 14, No. 3, Jun. 1986.

Lal George and Andrew W. Appel, "Iterated Register Coalescing," ACM Transactions on Programming Languages and Systems, vol. 18, No. 3, May 1996, pp. 300–324.

Fred C. Chow and John L. Hennessy, "The Priority–Based Coloring Approach to Register Allocation," ACM Transactions on Programming Languages and Systems, vol. 12, No. 4, Oct. 1990, pp. 501–536.

Briggs, Preston, et al., "Coloring Heuristics for Register Allocation," Department of Computer Science, Rice University, Houston, Texas, Jun. 1989.

Briggs, Preston, et al. "Coloring Register Pairs," ACM Letters on Programming Languages and Systems, vol. 1, No. 1, Mar. 1992, pp. 3–13.

Minwen Ji, et al., "Performance Measurements for Multi-threaded Programs," SIGMETRICS '98, ACM, 1998, pp. 168–170.

Cook, Jonathan E. and Alexander L. Wolf, "Event Based Detection of Concurrency," SIGSOFT '98, ACM, 1998, pp. 35–45.

Jenn–Yuan Tsai et al., "Performance Study of a Concurrent Multithreaded Processor," IEEE, 1998, pp. 24–35.

"Method of Tracing Events in Multi–Threaded OS/2 Applications,"IBM Tech., Disclosure Bulletin, Sep. 1993, pp. 19–22.

Priyadarshan Kolte and Mary Jean Harrold, "Load/Store Range Analysis for Global Register Allocation," ACM, Jun. 1991.

SangMin Shim and Soo–Mook Moon, "Split–Path Enhanced Pipleline Scheduling for Loops with Control Flows," IEEE, Dec. 2, 1998.

David Callahan and Brian Koblenz, "Register Allocation via Hierarchical Graph Coloring," Proceedings of the ACM SIGPLAN '91 Conference on Programming Language Design and Implementation, Toronto, Canada, Jun. 26–28, 1991.

* cited by examiner

METHOD AND SYSTEM FOR CALCULATING INSTRUCTION LOOKAHEAD

TECHNICAL FIELD

The present invention relates generally to compiler techniques, and more particularly to techniques for determining a lookahead value for an instruction.

BACKGROUND OF THE INVENTION

Parallel computer architectures generally provide multiple processors that can each be executing different tasks simultaneously. One such parallel computer architecture is referred to as a multithreaded architecture (MTA). The MTA supports not only multiple processors but also multiple streams executing simultaneously in each processor. The processors of an MTA computer are interconnected via an interconnection network. Each processor can communicate with every other processor through the interconnection network. FIG. 1 provides a high-level overview of an MTA computer. Each processor 101 is connected to the interconnection network and memory 102. Each processor contains a complete set of registers 101a for each stream. In addition, each processor also supports multiple protection domains 101b so that multiple user programs can be executing simultaneously within that processor.

Each MTA processor can execute multiple threads of execution simultaneously. Each thread of execution executes on one of the 128 streams supported by an MTA processor. Every clock time period, the processor selects a stream that is ready to execute and allows it to issue its next instruction. Instruction interpretation is pipelined by the processor, the network, and the memory. Thus, a new instruction from a different stream may be issued in each time period without interfering with other instructions that are in the pipeline. When an instruction finishes, the stream to which it belongs becomes ready to execute the next instruction. Each instruction may contain up to three operations (i.e., a memory reference operation, an arithmetic operation, and a control operation) that are executed simultaneously.

The state of a stream includes one 64-bit Stream Status Word ("SSW"), 32 64-bit General Registers ("R0–R31"), and eight 32-bit Target Registers ("T0–T7"). Each MTA processor has 128 sets of SSWs, of general registers, and of target registers. Thus, the state of each stream is immediately accessible by the processor without the need to reload registers when an instruction of a stream is to be executed.

The MTA uses program addresses that are 32 bits long. The lower half of an SSW contains the program counter ("PC") for the stream. The upper half of the SSW contains various mode flags (e.g., floating point rounding, lookahead disable), a trap disable mask (e.g., data alignment and floating point overflow), and the four most recently generated condition codes. The 32 general registers are available for general-purpose computations. Register R0 is special, however, in that it always contains a 0. The defining of register R0 has no effect on its contents. The instruction set of the MTA processor uses the eight target registers as branch targets. However, most control transfer operations only use the low 32 bits to determine a new program counter.

The instructions of an MTA are 64 bits long and contain a lookahead field, a memory operation, an arithmetic operation, and a control operation. The memory operation encodes an access to memory, the arithmetic operation encodes a computation to be performed on the values in the registers, and the control operation encodes a control transfer operation that may be conditional. An instruction may contain any combination of these operations. An MTA processor executes the operations of an instruction in parallel. In general, the executing instruction within a stream cannot begin (i.e., the instruction cannot be issued) until execution of the previous instruction completes. For example, if the previous instruction loaded a value from memory into a register and the next instruction reads that register, then the load must be complete before the register is read. Since arithmetic and control operations operate only on registers and not on main memory, an MTA processor can be executing multiple instructions that contain only these operations in parallel. Because of memory latency time, the execution of a memory operation may take as many as 70 clock time periods. Therefore, the next instruction after an instruction that contains a memory operation cannot be issued until the memory operation completes unless the processor knows that the next instruction does not "depend" on the results of memory operation.

Some processor architectures have been designed to inspect instructions to determine whether they have any dependencies on instructions whose execution is not yet complete. If there are no dependencies, then the instructions can be executed in parallel. The MTA provides the lookahead field of an instruction as an alternative to the inspection of instructions to determine dependencies. A programmer can set the lookahead field in each instruction to indicate a number of following instructions of the stream that are not dependent on that instruction. The MTA processor will not begin execution of more instructions in parallel with the current instruction than the lookahead number of instructions. The lookahead value of an instruction needs to take into consideration all possible paths of execution following that instruction. For example, if the next instruction contains a conditional branch, then the lookahead value can be set to be the minimum number of instructions to a dependent instruction whether or not the branch is taken. The MTA supports a 3-bit lookahead field in which lookahead values can range from zero to seven. A lookahead value of zero means that execution of the current instruction must complete before execution of the next instruction begins. If an instruction contains no memory operation, then the next instruction cannot be dependent on it. Therefore, the lookahead values in such instructions can be ignored by an MTA processor.

The dependency of one instruction upon another is more formally defined as follows. An instruction J depends on a memory operation of a previous instruction I if any operation in instruction J accesses a register that is modified by the memory operation of instruction I or if the memory operation in instruction J accesses the same memory as instruction I and either access modifies the memory.

The MTA supports designating a conditional branch operation as branching either "often" or "seldom." A conditional branch operation specifies a target location to which a processor transfers control if the condition is satisfied. If the condition is not satisfied, the processor transfers control to the next instruction by incrementing the program counter to point to the next location. A programmer may designate a conditional branch as "often" if it is anticipated that the branch will in general be taken. Otherwise, the programmer or code generator may designate the conditional branch as "seldom." If a conditional branch that is designated as "often" is not taken or a conditional branch that is designated as "seldom" is taken, then the MTA processor waits until all instructions previously issued for the stream complete before issuing the next instruction.

TABLE 1

```
1   (inst   3   (int_load r6 r3 16))
2   (inst   6   (int_load_disp r2 r3 8)       (int sub_test r0 r4 r5))
3   (inst   0   (jump     if_eq c0 t3))
4   (inst   0   (jump_often   if_ilt c0 t2))
5   (inst   0   (int_add r2 r6 r7))
```

Table 1 contains assembly language instruictions that illustrate the lookahead field and the often/seldom designation for a conditional branch. The syntax of an instructions is (inst 1*a* (M-op) (A-op) (C-op))

where "1*a*" represents the lookahead value, "M-op" represents a memory operation, "A-op" represents an arithmetic operation, and "C-op" represents a control operation. Instruction 1 has a lookahead value of 3 and a memory operation that indicates to load register r6 with the value from the memory location pointed to by the contents of register r3 plus 16 (i.e., r6=*(r3+16)). Instruction 2 has a lookahead value of 6, a memory operation of r2=*(r3+8), and an arithmetic operation of r0=r4-r5 that sets the condition code. Instructions 3, 4, and 5 have no memory operation so their lookahead value is ignored by the processor. Instruction 3 has a conditional branch that branches to the location pointed to by register t3 if the condition code indicates equality. Instruction 4 has a conditional branch that is designated as often and that branches to the location pointed to by register t2 if the condition code indicates less than. Instruction 5 has an arithmetic operation of r2=r6+r7.

The lookahead value of 3 in instruction 1 indicates instructions 2, 3, and 4 and the instruction pointed to by register t3 do not depend on instruction 1. Therefore, execution of these instructions can begin before execution of instruction 1 completes. The lookahead value of 6 in instruction 2 indicates that instructions 3 and 4, five instructions following target t3, and four instructions following target t2 do not depend on instruction 2. Although instruction 5 depends on instruction 2 (i.e., instruction 2 stores a value in register r2 and instruction 5 also stores a value in register r2), the conditional branch of instruction 4 is designated as often which means that all instructions in the process of being executed must complete before instruction 5 can be issued.

It would be desirable to have a technique for automatically calculating lookahead values for instructions and for designating conditional branch operations as either often or seldom to maximize the parallel execution of instructions of a stream.

The appendix contains the "Principles of Operation" of the MTA, which provides a more detailed description of the MTA.

SUMMARY OF THE INVENTION

Embodiments of the present invention provide a computer-based method and system for determining designations for conditional branch operations and settings for lookahead values for a portion of a computer program. The lookahead system of the present invention evaluates various combinations of designations for the conditional branch operations for the portion of the computer program. The lookahead system generates a metric to measure the amount of parallel processing that would result from each combination of designations assuming that the lookahead values are set to optimal values for that combination. This metric may take into consideration estimated or actual execution frequencies of the instructions. The lookahead system then designates the conditional branch operations and sets the lookahead values based on the metric generated for one of the combinations.

In one embodiment, the lookahead system designates a conditional branch operation of a branch instruction by reviewing paths of execution that include the branch instruction. For a path of execution that starts at a start instruction and includes the branch instruction that includes the conditional branch operation, the lookahead system calculates a number of instructions along that path of execution that do not depend on the start instruction. The lookahead system then designates the conditional branch operation as often or seldom based on the calculated number.

In another embodiment, the lookahead system calculates an instruction lookahead value for a start instruction without altering the designation of any conditional branches. For paths of execution that start at the start instruction, the lookahead system calculates a path lookahead value for the path of execution as the number of instructions along that path starting at the start instruction that do not depend on the start instruction. The lookahead system then sets the instruction lookahead value of the start instruction to the minimum of the calculated path lookahead values.

DETAILED DESCRIPTION

Figure 1:
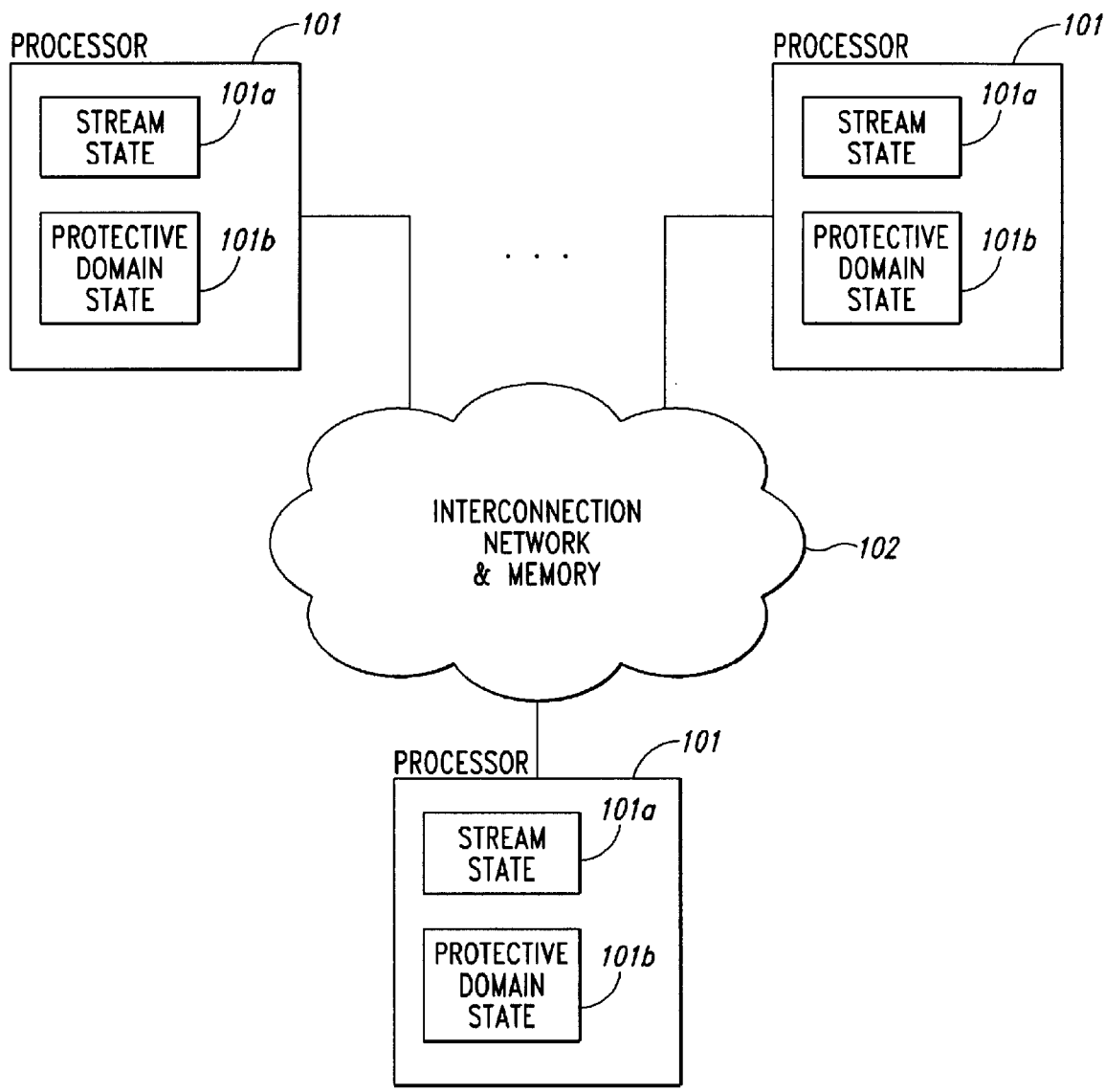
FIG. 1 provides a high-level overview of an MTA computer.

Embodiments of the present invention provide a computer-based method and system for generating lookahead values for instructions of a computer program. In one embodiment, the lookahead system calculates a lookahead value for a start instruction by locating the first dependent instruction along each path of execution from the start instruction. A path of execution is a sequence of instructions that may be executed during execution of the computer program. The lookahead system then sets the lookahead value for the start instruction to the minimum number of instructions between the start instruction and the first dependent instruction on any path of execution. To improve the speed of generating the lookahead value, the lookahead system may disregard the paths of execution that include an instruction that specifies that no other instruction can be issued until its execution completes. For example, the execution of an instruction that contains a conditional branch that is designated as seldom will complete before the instruction at the target location is issued. Also, the locating of the first dependent instruction can be limited on each path of execution to the maximum lookahead value number of instructions.

In another embodiment, the lookahead system changes the designation (i.e., often, seldom, or undesignated) of conditional branch operations to increase the parallel execution of the instructions of a computer program. In one embodiment, the lookahead system evaluates the amount of a parallelism that will result from various combinations of designations of the conditional branch operations of the computer program. Based on this evaluation, the lookahead system designates the conditional branch operations as indicated by the combination that results in the highest degree of parallelism. The lookahead system may also use instruction execution frequency information or branch probability information for the computer program to evaluate the amount of parallelism. Since an exhaustive search for the optimal combination of designations may be computationally expensive, various non-exhaustive techniques may identify a near-optimal combination at a fraction of the computational expense. For example, various heuristics can be used to prune possible combinations that are unlikely to be optimal; genetic algorithms can be used to hone in on a near optimal combination; and dynamic programming technique can be used to reduce the computational expense. Also, the lookahead system may only change the designation of conditional branch operations that are initially undesignated. In this way, a programmer or compiler with more knowledge of the anticipated execution of the computer program can effectively override the designation of the lookahead system. Also, the lookahead system may also allow a programmer to indicate that an undesignated conditional branch is to be left undesignated.

In one embodiment that is described below in detail, the lookahead system uses a bottom-up approach to determining the designations of conditional branches. This bottom-up approach represents the computer program as a control flow graph (described below) and determines the designations in a depth-first, left-to-right manner. That is, the lookahead system sets the designations of conditional branches generally in the reverse order in which the conditional branches would be executed. Once the lookahead system sets a designation of a conditional branch, all other possible combinations of designations for that conditional branch and lower conditional branches are pruned from the search space. In this embodiment, the lookahead system performs a depth-first, post-order traversal of the control flow graph of the computer program and designates each conditional branch in the order of traversal. The lookahead system also sets the lookahead value for each instruction to improve the parallelism based on the designations. The lookahead system can use various metrics to estimate the amount of parallelism that would result from particular combinations of designations. One metric factors in the probability of the condition of a conditional branch being satisfied and the number of dependent instructions on both paths of execution leading from that conditional branch. The metric may give an effective number of independent instructions that can be executed in parallel. For example, if the probability of the condition of a conditional branch being satisfied is 0.25 and the number of non-dependent instructions to be executed when the condition is satisfied is 5 and when the condition is not satisfied is 1, then the expected amount of parallelism is 1.25 (i.e., 0.25*5) when the condition is satisfied and the expected amount of parallelism is 0.75 (i.e., 0.75*1) when the condition is not satisfied. Therefore, the higher degree of parallelism would be achieved by designating the conditional branch operation as often even though it is only taken 25% of the time. If left undesignated, the actual amount of parallelism would be 1, which is the minimum number of non-dependent instructions on either path of execution. Also, it may be beneficial in certain situations to leave a conditional branch operation as undesignated. For example, if each path of execution starting from the conditional branch has the same number of non-dependent instructions, then, regardless of what is the probability of the condition being satisfied, the conditional branch should be undesignated. The expected amount of parallelism when left undesignated would be 2 (i.e., 1*2) because regardless of whether the condition is satisfied two additional instructions can be issued. The expected amount of parallelism, in contrast, if designated as often would be 1.5 (i.e., 0.75*2) and if designated as seldom would be 0.5 (i.e., 0.25*2).

Tables 2–4 provide an example of when it would always be beneficial to change the designation of a conditional branch. Tables 2–4 list a portion of a computer program. Tables 2 and 4 list assembly code and Table 3 lists the corresponding pseudocode. Instruction 2 of Table 2 contains an undesignated conditional branch; the lookahead value in instruction 1 is set to 1 because instruction 3, the instruction executed if the condition is not satisfied, depends on instruction 1. However, as shown in Table 4 if instruction 2 is designated as often, then the lookahead value in instruction 1 can be set to 2 to increase the amount of parallelism when the condition is satisfied.

TABLE 2

| 1 | (inst | 1 | (load_disp r2 r3 8) | (int_sub_test r0 r4 r5)) |
| 2 | (inst | 0 | (skip if_ilt c0 1) | |
| 3 | (inst | 0 | (int_add_imm r2 r2 1) | (skip if_always c0 2)) |
| 4 | (inst | 0 | (int_imm r6 1500)) | |
| 5 | (inst | 0 | (int_add_imm r2 r2 r6)) | |

TABLE 3

| 1 | r2=*(r3+8) |
| 2 | if(!(r4<r5)) |
| 3 | r2=r2+1 |
|   | else |
| 4 | r6=1500 |
| 5 | r2=r2+r6 |

TABLE 4

| 1 | (inst | 2 | (load_disp r2 r3 8) | (int_sub_test r0 r4 r5)) |
| 2 | (inst | 0 | (skip_often if_ilt c0 1) | |
| 3 | (inst | 0 | (int_add_imm r2 r2 1) | (skip if_always c0 2)) |
| 4 | (inst | 0 | (int_imm r6 1500)) | |
| 5 | (inst | 0 | (int_add_imm r2 r2 r6)) | |

The lookahead system uses the concept of a "basic block" when analyzing a computer program. A "basic block" is generally considered to be a series of one or more instructions having one and only one entrance instruction (i.e., where control enters the block), and one and only one exit instruction (i.e., where control exits the block). A "control flow graph" is a well-known structure for representing the flow of execution between basic blocks of a program. A control flow graph is a directed graph in which each node of the graph represents a basic block. A control flow graph has a directed edge from a block B1 to a block B2 if block B2 can immediately follow block B1 in some path of execution. In other words, a control flow graph has a directed edge from block B1 to block B2 (1) if the last instruction of block B1 includes a conditional or unconditional branch to the first instruction of block B2, or (2) if block B2 immediately follows block B1 in the order of the program and block B1 does not end in an instruction that includes an unconditional branch.

Figure 2:
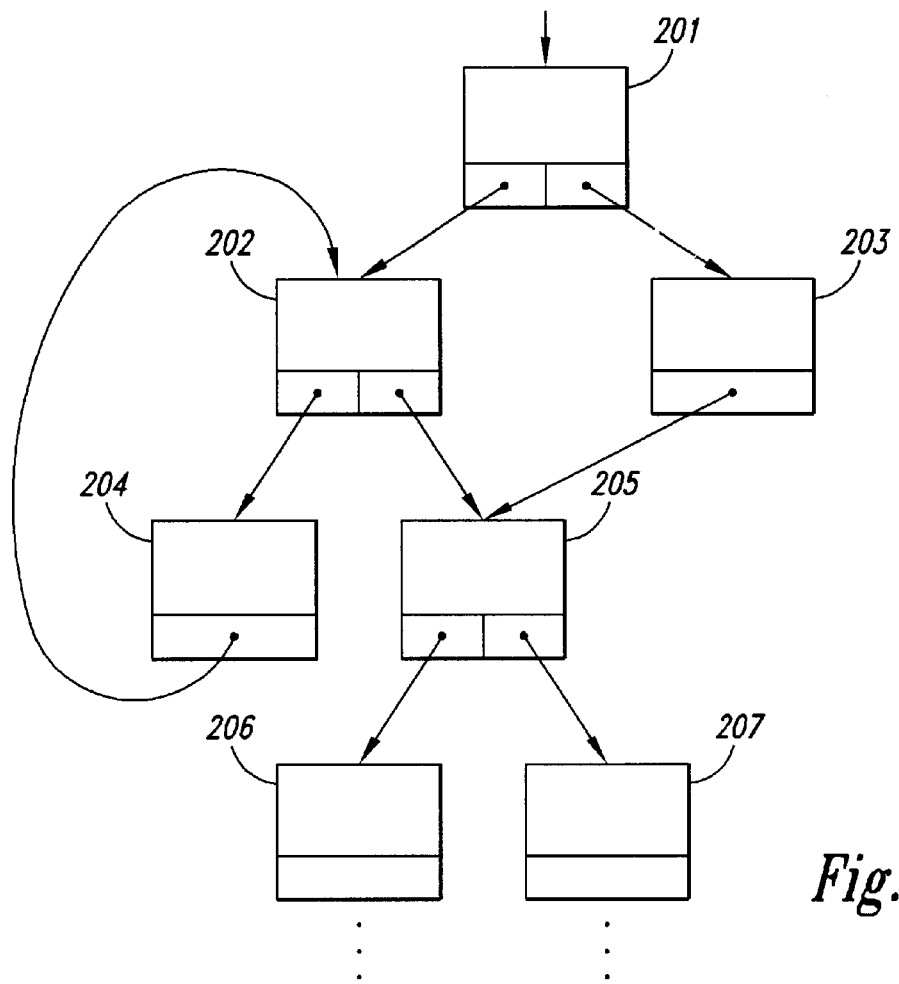
FIG. 2 illustrates a control flow graph for a sample program.
Figure 3:
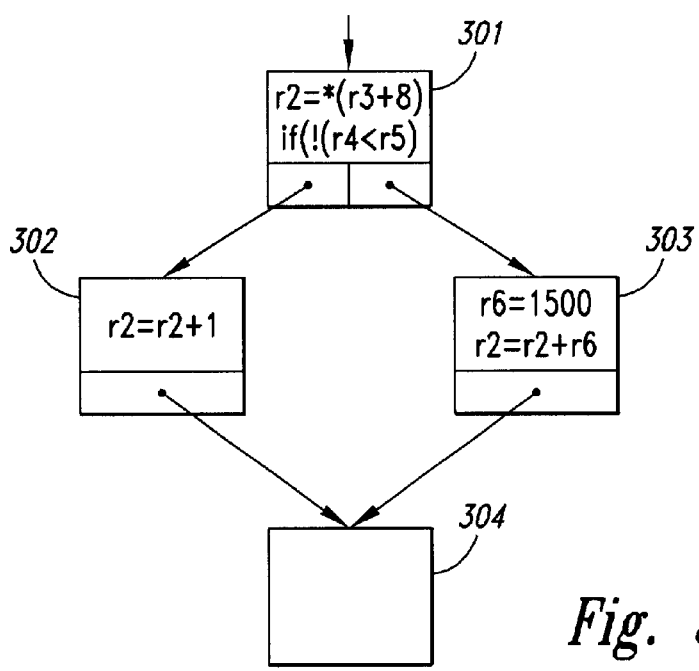
FIG. 3 illustrates a control flow graph for the example program of Tables 2–4.

FIG. 2 illustrates a control flow graph for a sample program. Each basic block 201–207 represents a node of the control flow graph and has an entrance and an exit instruction. If the exit instruction of a basic block includes a conditional branch, then two edges leave that basic block. For example, basic block 201 has a conditional branch and one of its edges points to basic block 202 and the other edge points to basic block 203. The instruction that follows a conditional branch is the next instruction, and the instruction pointed to by the target register of the conditional branch is the target instruction. FIG. 3 illustrates a control flow graph for the example program of Tables 2–4. Basic block 301 corresponds to instructions 1 and 2, basic block 302 corresponds to instruction 3, basic block 303 corresponds to instructions 4 and 5, and basic block 304 corresponds to the instructions located after instruction 5.

Figure 4:
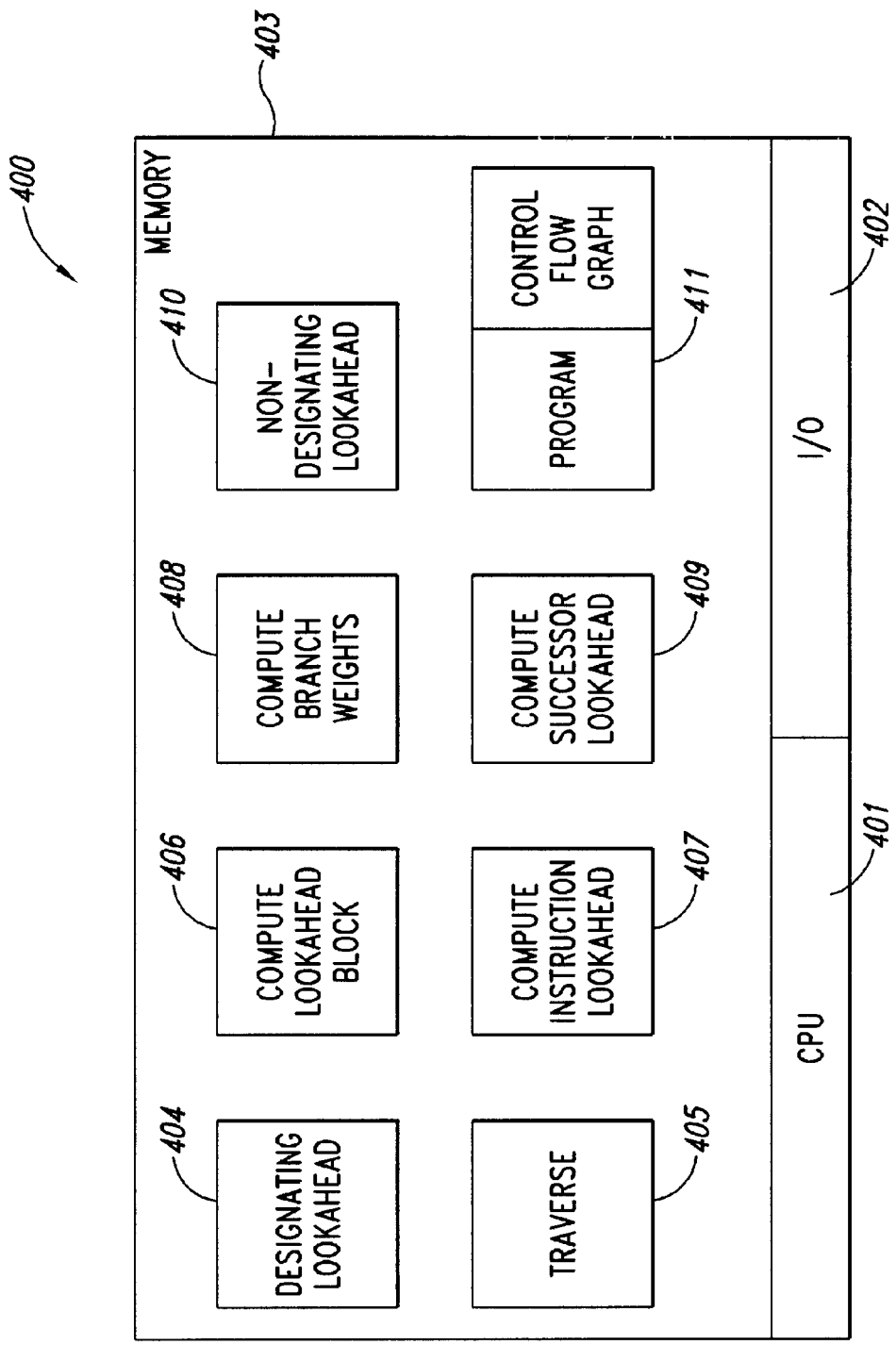
FIG. 4 is a block diagram illustrating components of one embodiment of the present invention.

FIG. 4 is a block diagram illustrating components of one embodiment of a lookahead system. The lookahead system may be implemented as part of a compiler, code generator, or post-compilation processor. The lookahead system may also be adapted to analyze executable code and designate conditional branches and set lookahead values. Computer 400 includes a central processing unit, input/output devices, and memory 403. The computer for practicing the invention uses any conventional architecture or a multithreaded architecture. The memory includes a designating lookahead component 404, a traverse component 405, a compute lookahead block component 406, a compute instruction lookahead component 407, a compute branch weights component 408, a compute successor lookahead component 409, a non-designating lookahead component 410, and program and control flow graph data 411. The designating lookahead component calculates the lookahead values for instructions of the program and designates conditional branch operations to improve parallelism of the program. The designating lookahead component invokes the traverse component which performs a depth-first, post-order traversal of the control flow graph and invokes the compute lookahead block component for each basic block of the control flow graph. The compute lookahead block component invokes the compute instruction lookahead component to calculate lookahead values for each instruction in a basic block. The compute instruction lookahead component invokes the compute successor lookahead component to calculate the lookahead value for an instruction. The non-designating component invokes the compute instruction lookahead component to calculate lookahead values without changing the designations of any conditional branches.

Figure 5:
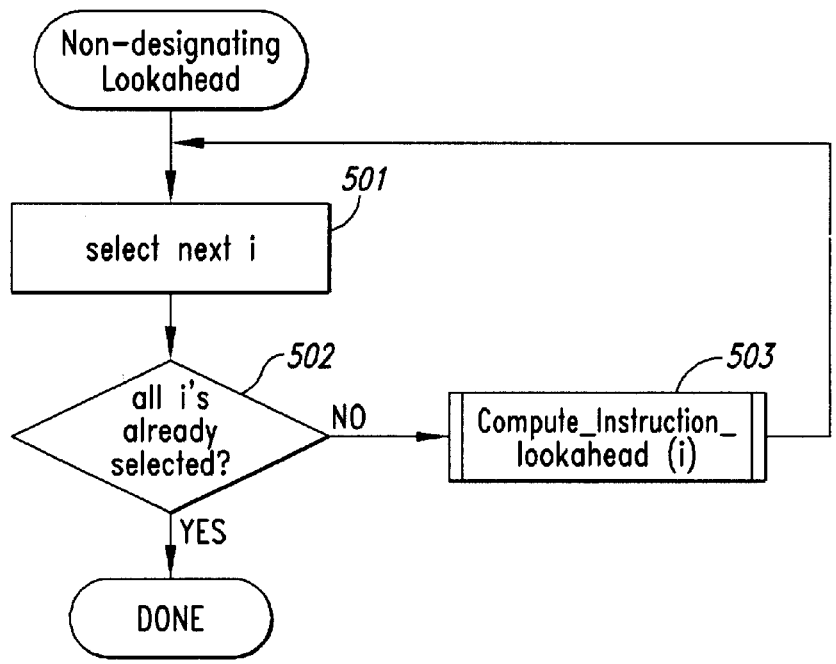
FIG. 5 is a flow diagram of an example implementation of a non-designating lookahead algorithm routine.

FIG. 5 is a flow diagram of an example implementation of a non-designating lookahead algorithm routine. The non-designating lookahead algorithm inputs a control flow graph and calculates a lookahead value for each instruction with a memory operation. The calculated lookahead value for an instruction represents the maximum possible lookahead value for that instruction. This routine takes into consideration the often/seldom designations of conditional branches, but does not change the designation of any conditional branch. In step 501, the routine selects the next instruction ("i") that has a memory operation, starting with the first instruction. In step 502, if all the instructions with a memory operation have already been selected, then the non-designating lookahead algorithm is complete, else the routine continues at step 503. In step 503, the routine invokes the function compute_instruction_lookahead passing the selected instruction. The function compute_instruction_ lookahead, described below, calculates and modifies a lookahead value for the selected instruction. The routine then loops to step 501 to select the next instruction.

Figure 6:
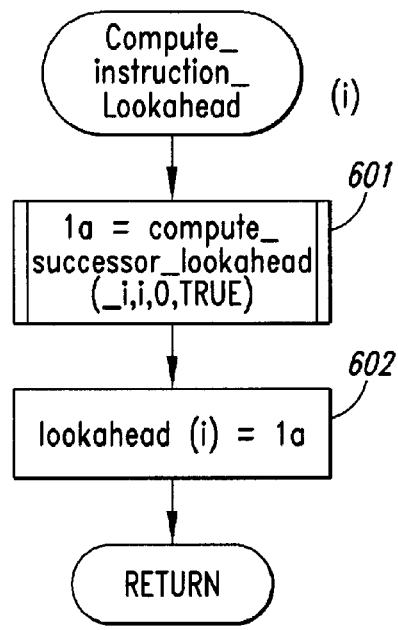
FIG. 6 is a flow diagram of an example implementation of a compute_instruction_lookahead function.

FIG. 6 is a flow diagram of an example implementation of a compute instruction_lookahead function. This function is passed an indication of instruction ("i"), calculates a lookahead value for that instruction, and stores that calculated lookahead value for the instruction. In step 601, the function invokes the function compute_successor_lookahead. The compute_successor_lookahead function, as described below in more detail, is a recursive function that returns the lookahead value ("1a") for the instruction. In step 602, the function stores the calculated lookahead value for the lookahead field of the instruction.

Figure 7:
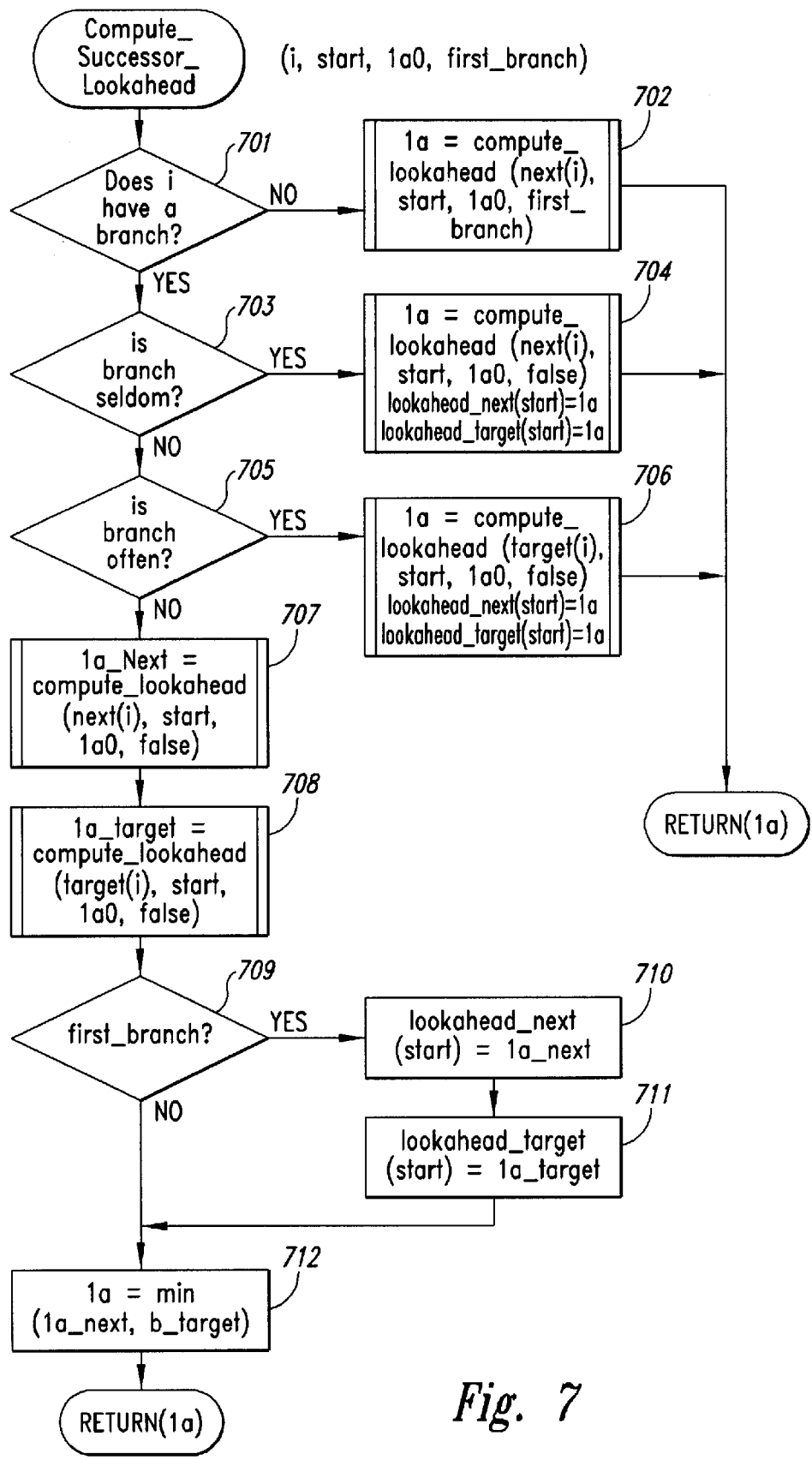
FIG. 7 is a flow diagram of an example implementation of a compute_successor_lookahead function.

FIG. 7 is a flow diagram of an example implementation of a compute_successor_lookahead function. The function is a recursive function that calculates the lookahead value for the passed instruction ("start") by recursively invoking the function for each instruction ("i") that is on a path of execution from the start instruction and that is less than the maximum lookahead number of instructions (e.g., 7) away. If the current instruction does not contain a conditional branch, then the function starts processing the next instruction after the current instruction. If the current instruction contains a conditional branch designated as either often or seldom, then the function calculates the lookahead value for either the target or the next instruction. Thus, the function uses knowledge of the designation to calculate the lookahead. If the current instruction contains a conditional branch that is not designated as either often or seldom, then the function calculates the lookahead value for both the target and the next instructions and sets the lookahead value for the current instruction to the minimum of the calculated lookahead values. The compute_successor_lookahead function is used by both the non-designating lookahead algorithm and the designating lookahead algorithm. The first_branch parameter is not needed for the non-designating lookahead algorithm, but is used by the designating lookahead algorithm to track whether a conditional branch has already been encountered along the path of execution from the start instruction to the current instruction. This function is passed an indication of the instruction for which the lookahead value is to be calculated ("start"), a current instruction along a path of execution from the start instruction ("i"), an accumulated lookahead value ("1a0") from the start instruction to the current instruction, and an indication of whether a branch has been encountered ("first_branch") along the path of execution from the start instruction to the current instruction. In step 701, if the current instruction includes a conditional branch, then the function continues at step 703, else the function continues at step 702. In step 702, the function invokes the compute lookahead function passing an indication of the next instruction following the current instruction, an indication of the start instruction, the accumulated lookahead value, and the indication of whether the first branch operation has yet to be encountered. The function then returns the lookahead value that was returned by the compute_lookahead function. In step 703, if the current instruction includes a conditional branch that is designated as seldom, then the function continues at step 704, else the function continues at step 705. In step 704, the function invokes the compute_lookahead function passing an indication of the next instruction, an indication of the start instruction, the accumulated lookahead value, and an indication that a conditional branch has already been encountered. The function sets the lookahead next and target values for the start instruction to the lookahead value returned by the invoked function. The function then returns lookahead value returned by the compute_lookahead function. In step 705, if the current instruction includes a conditional branch that is designated as often, then the function continues at step 706, else the function continues at step 707. In step 706, the function invokes the compute_lookahead function passing an indication of the target instruction, an indication of the start instruction, the accumulated lookahead value, and an indication that a conditional branch has already been encountered. The function sets the lookahead next and target values for the start instruction to the lookahead value returned by the invoked function. The function then returns the lookahead value returned by the compute_lookahead function. Steps 707–712 are executed when the conditional branch is not designated as often or seldom. In these steps, the function calculates a lookahead value for both paths of execution through the next instruction and the target instruction. The lookahead value is set to the minimum of the lookahead values. In step 707, the function invokes the compute_lookahead function passing an indication of the next instruction, an indication of the start instruction, the accumulated lookahead value, and an indication that a conditional branch has already been encountered. The function sets the lookahead next value ("1a_next") to the value returned by this function. In step 708, the function invokes the compute_lookahead function passing an indication of the target instruction, an indication of the start instruction, the accumulated lookahead value, and an indication that a conditional branch has already been encountered. The function sets a lookahead target value ("1a_target") to the value returned by this function. Steps 709–711 are steps included in this function to accommodate the designating lookahead algorithm described below. The steps, are not necessary for the non-designating lookahead algorithm. In step 709, if this is the first conditional branch from the start instruction to the current instruction, then the function continues at step 710, else the function continues at step 712. In step 710, the function sets a lookahead next value for the start instruction to the calculated lookahead next value. In step 711, the function sets a lookahead target value for the start instruction to the lookahead target value. In step 712, the function sets the accumulated lookahead value to the minimum of the lookahead next value and the lookahead target value and then returns that minimum value.

Figure 8:
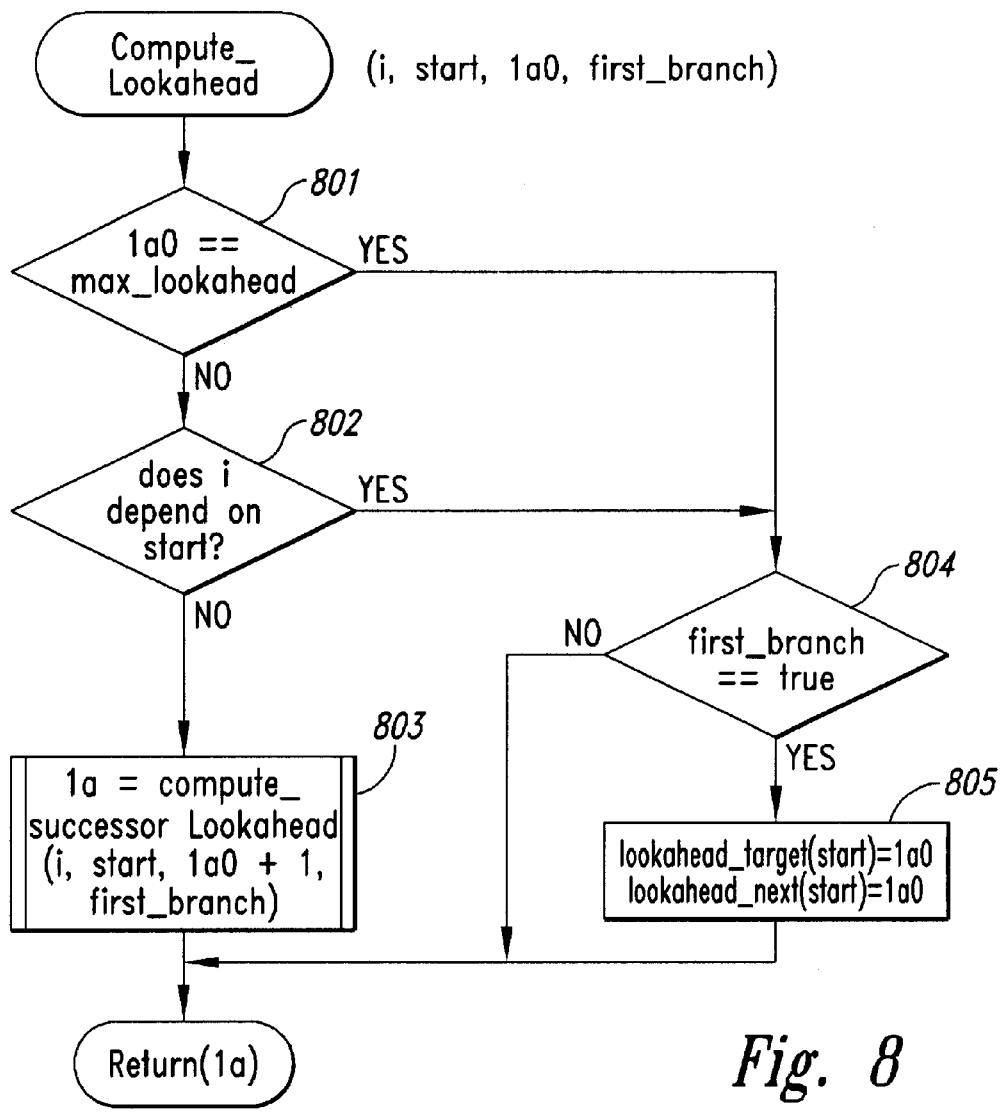
FIG. 8 is a flow diagram of an example implementation of the compute_lookahead function.

FIG. 8 is a flow diagram of an example implementation of the compute_lookahead function. This function determines whether the search for the accumulated lookahead value along the current path of execution should stop because the accumulated lookahead value equals the maximum lookahead value or because there is a dependency between the start instruction and the current instruction. To continue the accumulation, the function recursively invokes the compute_successor_lookahead function passing an incremented lookahead value. In step 801, if the accumulated lookahead value is equal to the maximum lookahead value, then the function continues at step 804, else the routine continues at step 802. In step 802, if there is a dependency between the start instruction and the current instruction, then the function continues at step 804, else the function continues at step 803. In step 804, if the first conditional branch has been encountered, then the function continues at step 805, else the function returns with the accumulated lookahead value. In step 805, the function sets the lookahead next and target values for the start instruction to the accumulated lookahead value and returns the accumulated lookahead value. In step 803, the function recursively invokes the compute_successor_lookahead function passing an indication of the current instruction, an indication of the start instruction, the accumulated lookahead value incremented by 1, and an indication whether the next branch operation to be encountered will be the first. The routine then returns the lookahead value returned by the compute_successor_lookahead function.

Figure 9:
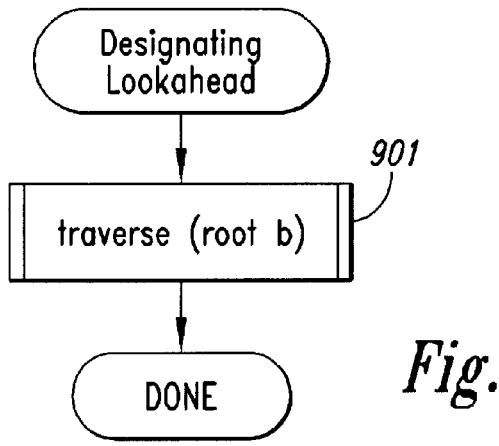
FIG. 9 is a flow diagram of an example implementation of the designating lookahead algorithm routine.

FIG. 9 is a flow diagram of an example implementation of the designating lookahead algorithm routine. The designating lookahead algorithm calculates the lookahead values for each instruction and determines whether a conditional branch that is not designated as often or seldom should be designated or left undesignated to maximize the parallel execution of the instructions. The routine performs a depth-first, post-order traversal of a control flow graph and calculates the lookahead value for each instruction in each basic block. If an instruction has an undesignated conditional branch operation as its first branch along its path of execution, then the routine calculates three lookahead values for that instruction corresponding to whether the conditional branch is left undesignated or designated as seldom or often. If the basic block has a conditional branch that is not designated, then the routine determines whether to designate the conditional branch and sets the lookahead value for the instructions in the basic block accordingly. In step 901, the routine invokes the traverse function passing the root basic block of the control flow graph. The routine then completes.

Figure 10:
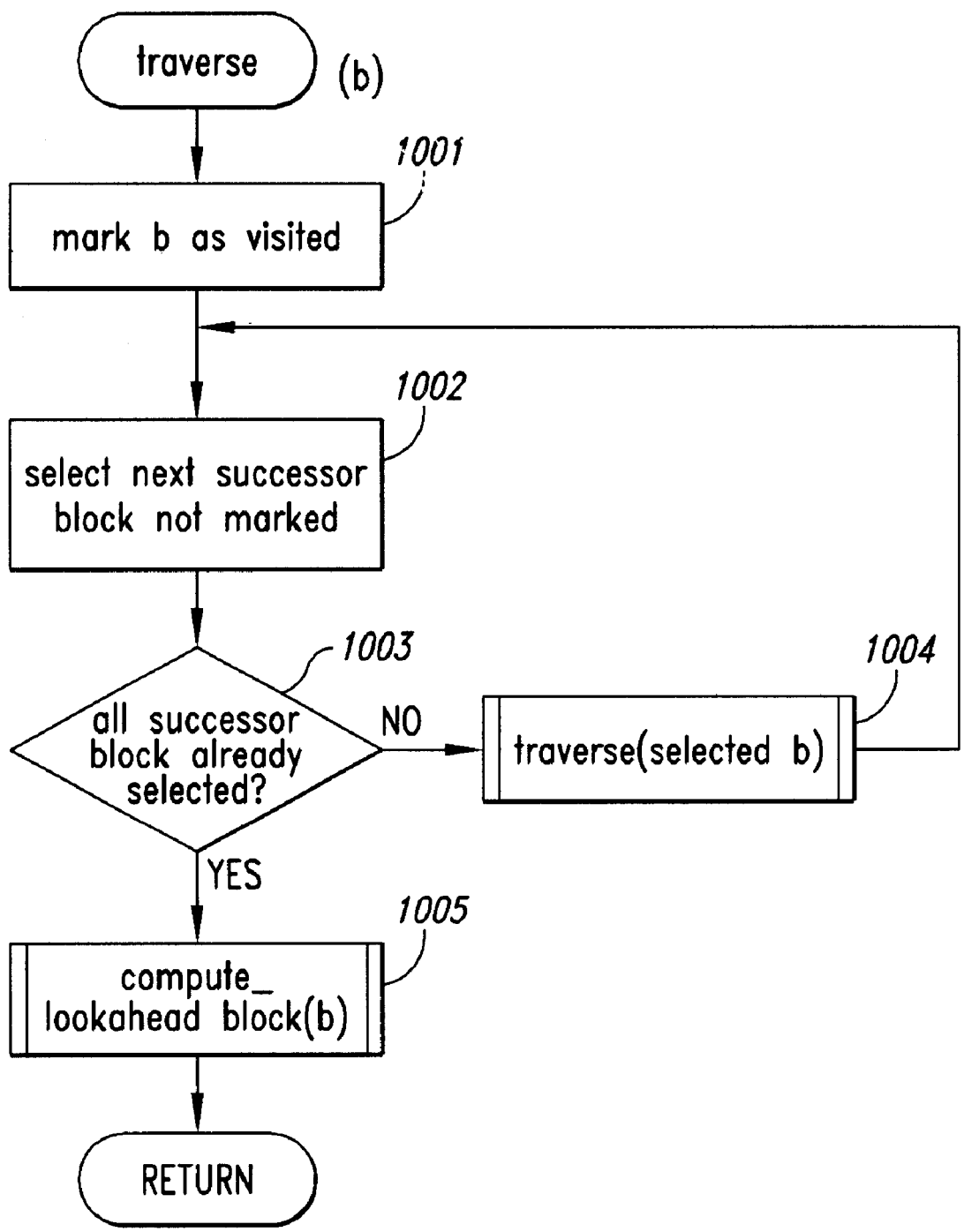
FIG. 10 is a flow diagram of a sample implementation of the traverse function.

FIG. 10 is a flow diagram of a sample implementation of the traverse function. The traverse function performs depth-first, post-order traversal of the control flow graph. This recursive function is passed an indication of a basic block ("b") of the control flow graph, calculates the lookahead values for the successor basic blocks, and calculates the lookahead values for the passed basic block. In step 1001, the function marks the passed basic block as being visited. In steps 1002–1004, the function loops selecting each of the successor basic blocks of the passed basic block that have not yet been marked. In step 1002, the function selects the next successor basic block that has not yet been marked. In step 1003, if all the successor basic blocks have already been marked, the function continues at step 1005, else the function continues at step 1004. In step 1004, the function recursively invokes the function traverse passing the selected basic block and loops to step 1002 to select the next successor basic block. In step 1005, the function invokes the compute_lookahead_block function passing the passed basic block. The compute_lookahead_block function calculates the lookahead values for the instructions of the passed basic block. The function then returns.

Figure 11:
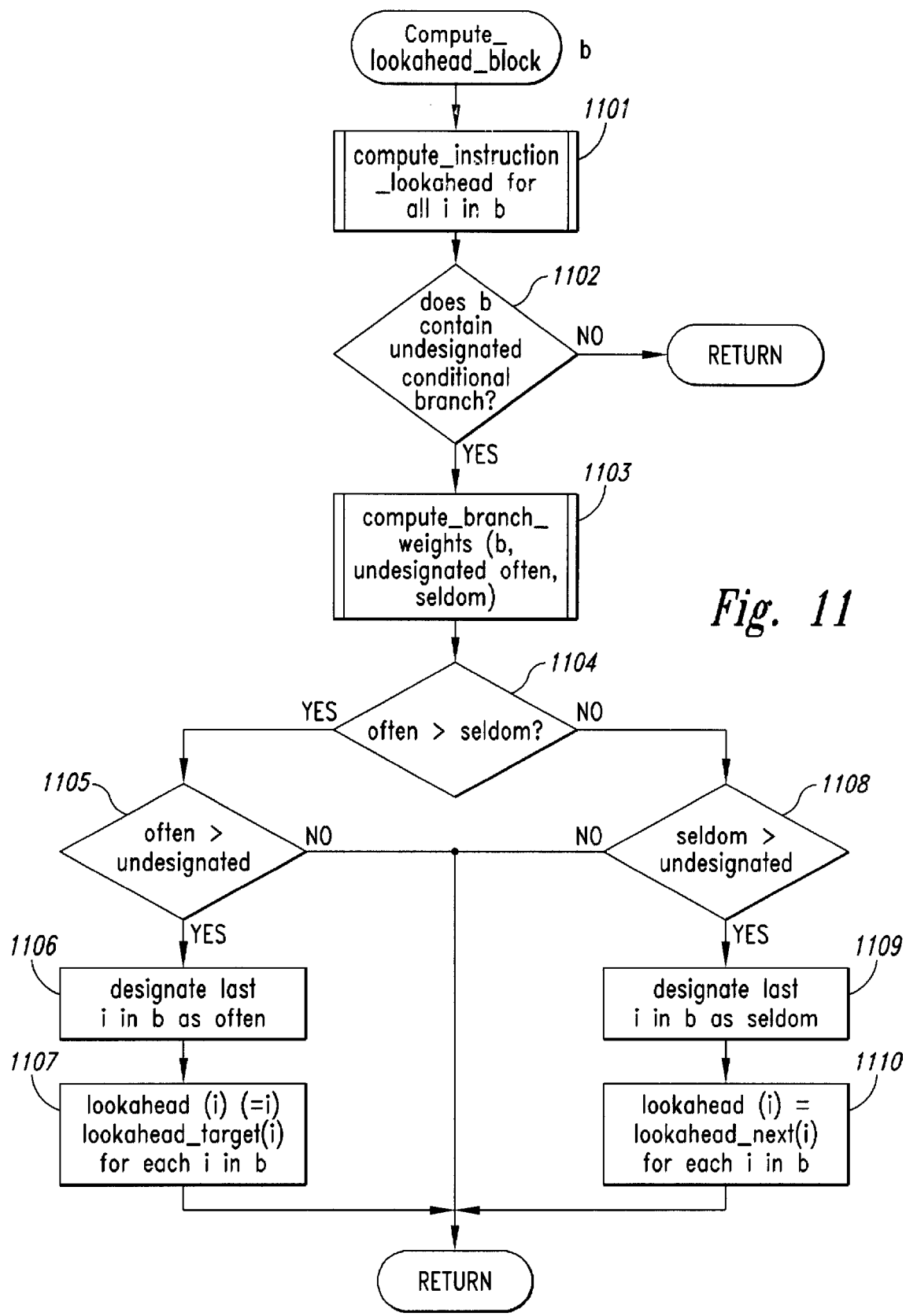
FIG. 11 is a flow diagram of an example implementation of the compute_lookahead_block function.

FIG. 11 is a flow diagram of an example implementation of the compute_lookahead_block function. This function is passed a basic block and determines whether the passed basic block has a conditional branch that is not designated as often or seldom and if so determines a designation for that branch operation. The function sets the lookahead values for the instructions in the passed basic block based on that designation and designates that conditional branch accordingly. In step 1101, the function invokes the compute_instruction_lookahead function for each instruction in the passed basic block. This invoked function calculates a lookahead value for an instruction assuming that the designation of no conditional branch is changed. If the passed basic block ends in an undesignated conditional branch, it also calculates lookahead values assuming the designation is changed to often or seldom. In step 1102, if the basic block contains an undesignated conditional branch, then the function continues at step 1103, else the function returns. In step 1103, the function invokes the compute_branch_weights function. That function is passed the basic block, and returns an indication as to whether the conditional branch should be left as undesignated or designated as often or seldom. The relative magnitude of the returned undesignated, often, and seldom arguments indicate the preferred designation. In step 1104, if the often value is greater than the seldom value, then the function continues at step 1105, else the function continues at step 1108. In step 1105, if the often value is greater than the undesignated value, then the function continues at step 1106, else the function returns. In step 1106, the function designates the conditional branch as often. In step 1107, the function sets the lookahead value for each instruction in the basic block to the lookahead target value that was calculated for that instruction in step 1101 and returns. In step 1108, if the seldom value is greater than the undesignated value, then the function continues at step 1109, else the function returns. In step 1109, the function designates the conditional branch as seldom. In step 1110, the function sets the lookahead value of each instruction of the basic block to the lookahead next value that was calculated in step 1101 and then returns.

Figure 12:
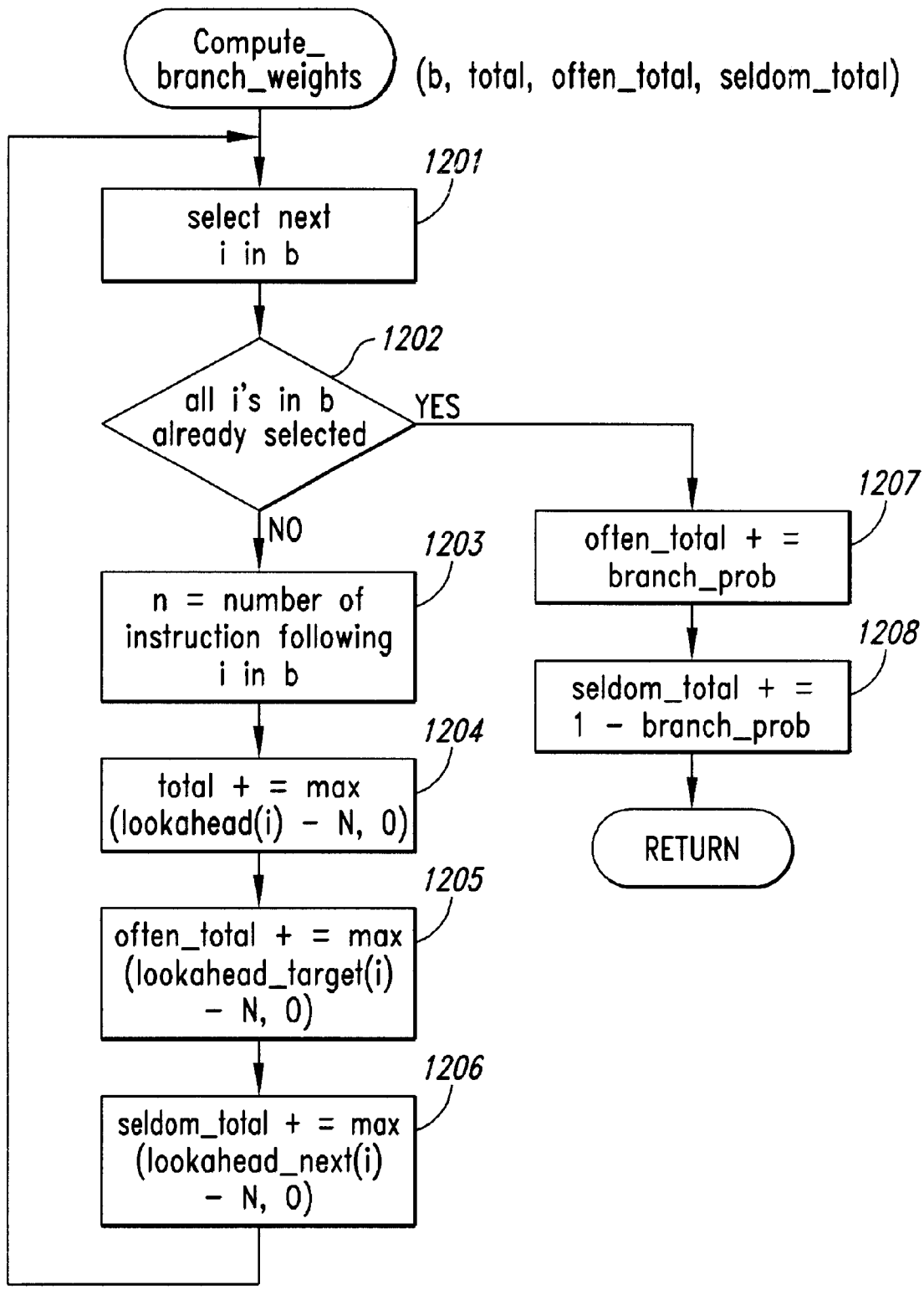
FIG. 12 is the flow diagram of an example implementation of the compute_branch_weights function.

FIG. 12 is the flow diagram of an example implementation of the compute_branch_weights function. This function is passed an indication of a basic block and returns an indication of the relative lookahead value benefit (i.e., expected amount of parallelism) if the branch operation is left undesignated or designated as often or seldom. In this implementation, the lookahead value benefit is the total of that portion of the lookahead values of the instructions in the basic block that is attributable to instructions following the conditional branch. This total may be multiplied by a probability that the condition is satisfied or not. In step 1201, the function selects the next instruction in the basic block, starting with the first. In step 1202, if all the instructions in the passed basic block have already been selected, then the function continues at step 1207, else the function continues that step 1203. In step 1203, the function sets the variable ii equal to the number of instructions following the currently selected instruction in the passed basic block. In step 1204, the function increments a total value by the portion of the lookahead value of the selected instruction attributable to instruction past the conditional branch. In step 1205, the function increments an often total value by the portion of the lookahead target value of the selected instruction attributable to instructions past the conditional branch. In step 1206, the function increments a seldom total value by the portion of the lookahead next value of the selected instruction attributable to instructions past the conditional branch. The function then loops to step 1201 to select the next instruction in the passed basic block. In step 1207, the function multiplies the often total value by a probability that the branch is taken (i.e., condition is satisfied). In step 1208, the function multiplies the seldom total value by a probability that the branch is not taken. The function then returns.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method in a computer for calculating an instruction lookahead value for a start instruction, the method comprising:

for paths of execution that start at the start instruction, calculating a path lookahead value for the path of execution as a number of instructions along that path starting at the start instruction that do not depend on the start instruction; and setting the instruction lookahead value to a minimum of the calculated path lookahead value.

2. The method of claim 1 wherein the calculating includes limiting the path lookahead value to a maximum possible instruction lookahead value.

3. The method of claim 1 wherein the number of instructions along that path does not include instructions along a target of a conditional branch operation that is designated as seldom.

4. The method of claim 1 wherein the number of instructions along that path does not include instructions following a conditional branch operation that is designated as often.

5. The method of claim 1 including:

for a path of execution that starts at the start instruction and includes a branch instruction with a conditional branch operation, calculating a number of instructions along that path of execution that do not depend on the start instruction; and designating the conditional branch operation as often or seldom based on the calculated number.

6. The method of claim 5 including calculating a number for a plurality of paths of execution and wherein the designating is based on the plurality of the calculated numbers.

7. The method of claim 6 wherein the designating weights the calculated number by a probability associated with the path of execution.

8. The method of claim 5 including setting a lookahead value for the start instruction based on the designation of the conditional branch operation.

9. The method of claim 5 wherein the calculating starts at the branch instruction.

10. The method of claim 1 including:

for each of a plurality of combinations of designations for the conditional branch operations for a portion of a computer program, generating a metric to measure an amount of parallel processing that would result from the combination of designations; and designating the conditional branch operations based on the metric generated for one of the combinations.

11. The method of claim 10 wherein a designation is a branch often designation.

12. The method of claim 10 wherein a designation is a branch seldom designation.

13. The method of claim 10 wherein the generating of the metric includes calculating lookahead values for instructions of the portion based on the combination.

14. The method of claim 10 wherein the computer program is to execute in a multithreaded processor.

15. The method of claim 10 wherein the designating of the conditional branch operations includes selecting the combination that the metric indicates will result in the highest amount of parallel processing.

16. The method of claim 10 wherein a conditional branch operation is left undesignated.

17. The method of claim 1 including designating a conditional branch operation as seldom or often or leaving a conditional branch operation undesignated based on the number of instructions on a path of execution starting with the start instruction.

18. The method of claim 17 wherein a conditional branch operation is designated as often even though the branch is taken seldom.

19. The method of claim 17 wherein a conditional branch operation is designated as seldom even though the branch is taken often.

20. The method of claim 17 wherein a conditional branch operation undesignated when each path of execution starting from the conditional branch has the same number of non-dependent instructions.

21. A method in a computer for designating a conditional branch operation of a branch instruction, the method comprising:

for a path of execution that starts at a start instruction and includes the branch instruction that includes the conditional branch operation, calculating a number of instructions along that path of execution that do not depend on the start instruction; and designating the conditional branch operation as often or seldom based on the calculated number.

22. The method of claim 21 including calculating a number for a plurality of paths of execution and wherein the designating is based on the plurality of the calculated numbers.

23. The method of claim 22 wherein the designating weights the calculated number by a probability associated with the path of execution.

24. The method of claim 21 including setting a lookahead value for the start instruction based on the designation of the conditional branch operation.

25. The method of claim 21 wherein the calculating starts at the branch instruction.

26. A method in a computer system for determining designations for conditional branch operations for a portion of a computer program, the method comprising:

for each of a plurality of combinations of designations for the conditional branch operations for the portion, generating a metric to measure amount of parallel processing that would result from the combination of designations; and designating the conditional branch operations based on the metric generated for one of the combinations.

27. The method of claim 26 wherein a designation is a branch often designation.

28. The method of claim 26 wherein a designation is a branch seldom designation.

29. The method of claim 26 wherein the generating of the metric includes calculating lookahead values for instructions of the portion based on the combination.

30. The method of claim 26 wherein the computer program is to execute in a multithreaded processor.

31. The method of claim 26 wherein the designating of the conditional branch operations includes selecting the combination that the metric indicates will result in the highest amount of parallel processing.

32. A computer-readable medium containing instructions for controlling a computer to calculate an instruction lookahead value for a start instruction, by a method comprising:

for paths of execution that start at the start instruction, calculating a path lookahead value for the path of execution as a number of instructions along that path starting at the start instruction that do not depend on the start instruction; and setting the instruction lookahead value based on the calculated path lookahead values.

33. The computer-readable medium of claim 32 wherein the calculating includes limiting the path lookahead value to a maximum possible instruction lookahead value.

34. The computer-readable medium of claim 32 wherein the number of instructions along that path does not include instructions along the target of a conditional branch operation that is designated as seldom.

35. The computer-readable medium of claim 32 wherein the number of instructions along that path does not include instructions following a conditional branch operation that is designated as often.

36. A computer-readable medium containing instructions controlling a computer system to designate a conditional branch operation of a branch instruction, by a method comprising:

for a path of execution that starts at a start instruction and includes a branch instruction with a conditional branch operation, calculating a number of instructions along that path of execution that do not depend on the start instruction; and designating the conditional branch operation as often or seldom based on the calculated number.

37. The computer-readable medium of claim 36 including calculating a number for a plurality of paths of execution and wherein the designating is based on the plurality of the calculated numbers.

38. The computer-readable medium of claim 36 wherein the designating weights the calculated number by a probability associated with the path of execution.

39. The computer-readable medium of claim 36 including setting a lookahead value for the start instruction based on the designation of the conditional branch operation.

40. The computer-readable medium of claim 36 wherein the calculating starts at the branch instruction.

41. The computer-readable medium of claim 37 wherein a conditional branch operation undesignated when each path of execution starting from the conditional branch has the same number of non-dependent instructions.

42. A computer-readable medium containing instructions for controlling a computer system to determine a designation for conditional branch operations for a portion of a computer program, by a method comprising:

for each of a plurality of combinations of designations for the conditional branch operations for the portion of the computer program, generating a metric to measure an amount of parallel processing that would result from the combination of designations; and designating the conditional branch operations based on the metric generated for one of the combinations.

43. The computer-readable medium of claim 42 wherein a designation is a branch often designation.

44. The computer-readable medium of claim 42 wherein a designation is a branch seldom designation.

45. The computer-readable medium of claim 42 wherein the generating of the metric includes calculating lookahead values for instructions of the portion based on the combination.

46. The computer-readable medium of claim 42 wherein the computer program is to execute in a multithreaded processor.

47. The computer-readable medium of claim 42 wherein the designating of the conditional branch operations includes selecting the combination that the metric indicates will result in the highest amount of parallel processing.

48. The computer-readable medium of claim 42 wherein a conditional branch operation is left undesignated.

49. The computer-readable medium of claim 42 including designating a conditional branch operation as seldom or often or leaving a conditional branch operation undesignated based on the number of instructions on a path of execution starting with the start instruction.

50. The computer-readable medium of claim 49 wherein a conditional branch operation is designated as often even though the branch is taken seldom.

51. The computer-readable medium of claim 49 wherein a conditional branch operation is designated as seldom even though the branch is taken often.

52. A computer system for calculating an instruction lookahead value for a start instruction, the system comprising:

means for calculating a path lookahead value for paths of execution starting at the start instruction, the path lookahead value indicating a number of instructions along that path starting at the start instruction that do not depend on the start instruction; and means setting the instruction lookahead value based on the calculated path lookahead value.

53. The system of claim 52 wherein the means for calculating limits the path lookahead value to a maximum possible instruction lookahead value.

54. The system of claim 52 wherein the number of instructions along that path does not include instructions along the target of a conditional branch operation that is designated as seldom.

55. The system of claim 52 wherein the number of instructions along that path does not include instructions following a conditional branch operation that is designated as often.

56. A computer system for designating a conditional branch operation of a branch instruction, comprising:

means for calculating a number of instructions along that path of execution that do not depend on a start instruction for each path of execution that starts at the start instruction and that includes the branch instruction;

means for, when a path of execution that starts at the start instruction includes a branch instruction with a conditional branch operation, designating the conditional branch operation as often or seldom based on the calculated number.

57. The system of claim 56 wherein the means for designating is based on a plurality of the calculated numbers.

58. The system of claim 57 wherein the means for designating weights the calculated number by a probability associated with a path of execution.

59. The system of claim 56 including setting a lookahead value for the start instruction based on the designation of the conditional branch operation.

60. The system of claim 56 wherein the calculating starts at the branch instruction.

61. A computer system for determining designations for conditional branch operations for a portion of a computer program, comprising:

means for generating a metric to measure an amount of parallel processing that would result from a combination of designations, for each of a plurality of combinations of designations for conditional branch operations for a portion of a computer program; and means for designating the conditional branch operations based on the metric generated for one of the combinations.

62. The system of claim 61 wherein a designation is a branch often designation.

63. The system of claim 61 wherein a designation is a branch seldom designation.

64. The system of claim 61 wherein the generating of the metric includes calculating lookahead values for instructions of the portion based on the combination.

65. The system of claim 61 wherein the computer program is to execute in a multithreaded processor.

66. The system of claim 61 wherein designating of the conditional branch operations selects the combination that the metric indicates will result in the highest amount of parallel processing.

67. The system of claim 61 wherein a conditional branch operation is left undesignated.

68. The system of claim 61 wherein a conditional branch operation is designated as seldom or often or left undesignated based on the number of instructions on a path of execution starting with the start instruction.

69. The system of claim 68 wherein a conditional branch operation is designated as often even though the branch is taken seldom.

70. The system of claim 68 wherein a conditional branch operation is designated as seldom even though the branch is taken often.

71. The system of claim 68 wherein a conditional branch operation undesignated when each path of execution starting from the conditional branch has the same number of non-dependent instructions.

* * * * *

UNITED STATES PATENT AND TRADEMARK OFFICE
CERTIFICATE OF CORRECTION

PATENT NO. : 6,430,676 B1
DATED : August 6, 2002
INVENTOR(S) : Brian D. Koblenz

It is certified that error appears in the above-identified patent and that said Letters Patent is hereby corrected as shown below:

Column 3,
Line 9, "instruictions" should be -- instructions --;

Column 8,
Line 14, "compute instruction_lookahead" should be
-- compute_instruction_lookahead --;

Column 11,
Line 46, "ii" should be -- n --;
Line 51, "instruction" should be -- instructions --;

Signed and Sealed this

Fourth Day of February, 2003

JAMES E. ROGAN
*Director of the United States Patent and Trademark Office*